(12) United States Patent
Fenn et al.

(10) Patent No.: US 6,838,177 B2
(45) Date of Patent: Jan. 4, 2005

(54) PROCESS FOR PRIMING A SURFACE AND ARTICLE

(75) Inventors: David Robert Fenn, Allison Park, PA (US); Iain W. Harvey, Avon, OH (US); Henryk Skorupski, Slough (GB); David N. Walters, Slippery Rock, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/239,604

(22) PCT Filed: Feb. 27, 2001

(86) PCT No.: PCT/GB01/00820

§ 371 (c)(1),
(2), (4) Date: Sep. 24, 2002

(87) PCT Pub. No.: WO01/74499

PCT Pub. Date: Oct. 11, 2001

(65) Prior Publication Data

US 2003/0059555 A1 Mar. 27, 2003

(30) Foreign Application Priority Data

Mar. 31, 2000 (GB) .............................................. 0007728

(51) Int. Cl.$^7$ ............................................... B32B 27/38

(52) U.S. Cl. ...................... 428/414; 427/140; 427/355; 427/385.5; 427/404; 427/407.1; 427/409; 427/410; 427/514; 427/558; 427/559; 427/595; 428/411.1; 428/416; 428/457

(58) Field of Search ............................. 428/414, 411.1, 428/416, 457; 427/140, 355, 404, 407.1, 409, 410, 514, 558, 559, 385.5, 595

*Primary Examiner*—Bernard Pianalto
(74) *Attorney, Agent, or Firm*—Donald R. Palladino

(57) ABSTRACT

There is disclosed a process of priming a surface (preferably part of a vehicle) comprising; i) applying a UV radiation curable primer to the area to be primed; ii) curing the primer with UV radiation provided by one or more UV lamps having a UV-B:UV-A ratio of 1:1 or less and substantially no UV-C content, the UV radiation curable primer containing: A. 0–84% by weight of one or more compounds containing one ethylenically unsaturated free-radically polymerisable group per molecule; B. 5–50% by weight of one or more compounds containing two or more ethylenically unsaturated free radically polymerisable groups per molecule; C. 10–70% by weight of one or more pigments, fillers and/or dyes; D. 1–8% by weight of one or more photoinitiators; E. 0–20% by weight of volatile organic solvent and; F. 0–15% by weight of customary additives. Preferably the process also includes sanding the primer and topcoating the primer with one or more topcoats. There is also disclosed a surface whenever treated in a process of the invention.

24 Claims, No Drawings

PROCESS FOR PRIMING A SURFACE AND ARTICLE

This invention relates to a process of priming a surface, especially that of a vehicle, eg. as part of a refinishing wherein
1. a radiation curable primer composition is first applied and is cured by UV radiation and
2. the primer is topcoated by one or more topcoats.

Coatings used for the repair painting of motor vehicles generally comprise several layers of different coating compositions. The initial coating is usually a primer coating. The primer coating provides adhesion to the substrate, which can be bare metal or can be existing primer or topcoat or a mixture of these depending on the nature of the repair. The primer is also formulated so as to provide a relatively thick layer of coating which can be sanded (also known as 'flatted') using sand- or glasspaper so as to obliterate minor imperfections in the substrate and so provide a perfectly flat surface for subsequent layers of coating. The primer thus commonly contains pigments and/or fillers to allow it to be sanded easily. Typically the thickness of the primer coating will be from 50 to 200 μm. Over the primer, a topcoat is applied which itself can comprise more than one type of coating such as a basecoat and a clearcoat.

One class of coating compositions, which is well known for use in primers, comprises a hydroxyl functional polymer, such as a polyester or acrylic polymer, and a polyisocyanate. These two components react together after application to the substrate to form a polyurethane coating. These compositions are often thus referred to as 'polyurethane coating compositions' although strictly the polyurethane is only formed when the coating crosslinks. Polyurethane primers of this general type have been known for at least 20 years.

One problem with using polyurethane primers is that sufficient time has to be allowed for curing to occur before they can be sanded and topcoated. If a primer is sanded and topcoated before it has cured sufficiently, sanding is very difficult and time consuming, and the topcoat can interact with the primer leading to poor appearance of the coated article. Typically a primer has to be cured for 2–4 hours at ambient temperature before it can be sanded and topcoated. Alternatively it can be baked at approximately 60° C. for about thirty minutes. This option is often not preferred as it utilises valuable oven space, which is usually reserved for the curing of topcoats.

A second problem with polyurethane primers is that they contain relatively high levels of organic solvents. Due to environmental considerations there is a general trend in the coatings industry towards coating compositions with reduced solvent content. One way to achieve a lower solvent content is to use so-called high solids compositions. High-solids compositions are solventborne compositions, which contain a relatively high level of non-volatile materials such as film forming polymer, pigments and fillers and a relatively low level of organic solvent. A problem with formulating high solids coating compositions suitable for use in painting motor vehicles is that the compositions have unacceptably high viscosity. This is because the film forming polymers traditionally used in this field have a high solution viscosity in high solids solutions. The high viscosity gives rise to problems in application with poor flow out and consequently poor appearance.

A third problem with polyurethane primers is that they suffer from the disadvantage that polyisocyanates are known respiratory sensitisers and so considerable care must be taken in their use, particularly to prevent inhalation of the paint spray by the operator during spraying. This usually requires the operator to wear an air-fed breathing mask. Clearly, an alternative type of paint is desirable.

A fourth problem with polyurethane primers is that they do not usually provide excellent humidity and corrosion resistance when applied over bare metal. A separate etch primer or adhesion primer needs to be applied to the metal before the polyurethane primer is used. This further increases the time required to complete the repair.

We have discovered a process that utilises a primer composition that can be cured by exposure to UV radiation having a very low UV-B content and substantially no UV-C content. The process can be operated easily and safely in a typical automotive refinish bodyshop. Little or no organic solvent is emitted during the application and cure of the primer and the primer can be applied and cured in a very short time-period. The UV-cured primer gives excellent humidity and corrosion resistance, even when used without a separate etch primer or adhesion primer.

Radiation cured coating compositions are well known. The current state of the art has been summarised in the September 1999 issue of the European Coatings Journal, pages 21–49. Application is mostly limited to flat substrates that are coated on a production line. Curing is sometimes carried out under an inert atmosphere.

This is a very different situation to vehicle refinishing. Application is carried out by skilled craftsmen, every repair is different and the coating is usually applied in the same area that is used for curing. A radiation cured coating that is suitable for vehicle refinishing needs to be safer, more robust and more adaptable than the compositions described in the above article. In addition it would, of course, be extremely difficult to operate under an inert atmosphere in a body shop.

There have been some disclosures of radiation curable compositions for vehicle refinish but none of these fully meet the above requirements.

WO 98 40 170 describes a coating composition that cures by two discreet types of crosslinking. System A is thermally curable by addition and/or condensation and is free from radically polymerisable double bonds and system B is curable by radical polymerisation and is not able to crosslink with system A. This application is restricted to clear coating compositions.

DE 196 35 447 describes a process for refinishing that involves the use of pulsed high energy UV radiation to cure a clearcoat or pigmented topcoat.

GB 2 226 566 describes a coating composition for automobile underbody sections. The compositions are cured by high-powered UV radiation.

None of the above citations disclose a process for refinishing that involves a UV radiation cured primer and that could be operated in a typical bodyshop without involving expensive equipment or safety measure to exclude personnel from the curing area.

According to the present invention there is provided a process of priming a surface (preferably part of a vehicle) comprising;
i) applying a UV radiation curable primer to the area to be primed
ii) curing the primer with UV radiation provided by one or more UV lamps having a UV-B:UV-A ratio of 1:1 or less and substantially no UV-C content,
the UV radiation curable primer containing
A. 0–84% by weight of one or more compounds containing one ethylenically unsaturated free-radically polymerisable group per molecule
B. 5–50% by weight of one or more compounds containing two or more ethylenically unsaturated free radically polymerisable groups per molecule C. 10–70% by weight of one or more pigments, fillers and/or dyes
D. 1–8% by weight of one or more photoinitiators
E. 0–20% by weight of volatile organic solvent and
F. 0–15% by weight of customary additives.

The process of the invention can be a process of refinishing, e.g. of a vehicle. Refinishing is the process of repairing or repainting an already painted surface e.g. a surface of a vehicle. Preferably the process also includes the step of:

iii) sanding the primer and topcoating the primer with one or more topcoats.

The spectral output of a given radiation source can be measured with an energy dispersive spectrograph comprising a monochromater and light detector whose sensitivity is known at the relevant wavelengths. The ratio of UB-B:UV-A is arrived at by integrating the intensities of spectral output in the respective wavelength ranges. An example of a suitable instrument is the model 440 spectrometer available from Spectral Instruments, Tucson Ariz., USA.

In general, the type and level of component A are chosen to give the composition a suitable viscosity and to dissolve components B and D. The choice and level of component A also affects the hardness of the coating. The type and level of component C are chosen so that the composition has suitable adhesion, flexibility, hardness and solvent resistance. Preferably the ethylenically unsaturated groups in component A and component B are principally acrylate groups as this results in rapid cure rate.

Examples of compounds suitable as component A are alpha-beta unsaturated aliphatic compounds such as 1-octene, 1-hexene and 1-decene, vinyl esters such as vinyl acetate, styrene, substituted styrenes such as alpha-methylstyrene or p-methylstyrene, esters of methacrylic acid and esters of acrylic acid. Preferably component A consists principally of alkyl esters of acrylic acid such as butyl acrylate, t-butyl acrylate, isobornyl acrylate, isodecyl acrylate, 2-ethylhexyl acrylate, lauryl acrylate, cyclohexyl acrylate and octyl acrylate. More preferably component A consists principally of isobornyl acrylate and/or 2-ethylhexyl acrylate. Preferably the primer contains 5–50% by weight of component A, more preferably 10–40% by weight, even more preferably 25 to 35% by weight.

Examples of compounds suitable as component B include diacrylates such as hexanediol diacrylate or tripropyleneglycol diacrylate, triacrylates such as trimethylolpropane triacrylate, alkoxylated trimethylolpropane triacrylate or pentaerythritol triacrylate, polyacrylates such as pentaerythritol tetraacrylate or dipentaerythritol hexaacrylate, epoxy acrylates obtained for example by reacting epoxides with acrylic acid such as UVE 100 and UVE 150 available from Croda or Actilane 320 or Actilane 330 available from Akcros Chemicals, urethane acrylates such as Ebecryl 264 available from UCB chemicals or Actilane 251 available from Akcros Chemicals or unsaturated polyesters such as polyesters prepared with maleic anhydride as one of the monomeric components. Preferably component B consists principally of one or more epoxy acrylates and/or one or more urethane acrylates, more preferably component B consists principally of one or more epoxy acrylates. Preferably the primer contains 10–40% by weight of component B, more preferably 25 to 35% by weight.

In principle any known pigment or filler can be used as component C.

Conventional pigments such as titanium dioxide and zinc oxide can be included.

Suitable fillers include clays, barytes, mica, talcs and calcium carbonate.

Component C can include those pigments which are known to inhibit corrosion such as strontium chromate, zinc phosphate and barium metaborate.

Preferred pigments and fillers are those that do not interfere substantially with the radical cure. Preferably component C consists principally of zinc sulphide, barium sulphate, china clay and corrosion inhibiting pigments. More preferably component C consists principally of china clay and corrosion inhibiting pigments. China clay is hydrated aluminium silicate obtained from sedimentary kaolin clays. An example of a suitable china clay is Speswhite china clay available from ECC International.

The types and levels of pigments are chosen principally in order to achieve excellent sandability and corrosion resistance. Preferably the levels and types of pigments and fillers are chosen to achieve a pigment volume concentration (PVC) of 10–50%, more preferably 15–25%. The PVC is the ratio of the volume of pigment to the total volume of non-volatile material present in the whole composition expressed as a percentage.

Primer compositions containing preferred pigments are often transparent or translucent. In many cases it is desirable if the thickness of the coating can be estimated during application. One way of achieving this is to include a dye in the composition. Suitable dyes include metal complex dyes such as the Zapon® range available from BASF Aktiengesellschaft. When a dye is present, it is preferably present at a level of 0.005–1% by weight based on the total composition, more preferably 0.02–0.05%. An alternative way of achieving this is to include a metal flake pigment in the composition. Suitable metal flake pigments include aluminium flake pigments such as the Stappa range available from Eckart-Werke. When metal flake pigment is present, it is preferably present at a level of 0.1–10% by weight based on the total composition, more preferably 0.25–1%.

Component D can consist of any photoinitiators that are capable of generating free radicals when exposed to radiation having a UV-B: UV-A ratio of 1:1 or less. Preferably the photoinitiator(s) are capable of generating free radicals when exposed to radiation having a UV-B:UV-A ratio is 0.2:1 or less, more preferably 0.05:1 or less and even more preferably 0.025:1 or less. A preferred class of photoinitiator is bis acyl phosphine oxides, for example Irgacure 819 available from Ciba.

Preferably the primer contains 1–3% by weight of component D.

The volatile organic solvent can be any solvent which will dissolve components A, B, D and F. It can be an aliphatic or aromatic hydrocarbon such as Solvesso 100™, toluene or xylene, an alcohol such as butanol or isopropanol, an ester such as butyl acetate or ethyl acetate, a ketone such as acetone, methyl isobutyl ketone or methyl ethyl ketone, an ether, an ether-alcohol or an ether-ester easter such as ethyl 3-ethoxypropionate or a mixture of any of these. Preferably it is acetone and/or methyl ethyl ketone and/or ethyl 3-ethoxypropionate.

The level and type of solvent used will depend on the viscosity of the other components and the intended application method. In a preferred embodiment the primer contains no volatile organic solvent.

The primer composition may also contain, as component F, conventional additives such as photosynergists, adhesion promoters, pigment dispersants, flow aids, wetting aids and rheology modifiers.

In a preferred embodiment the primer contains
25 to 35% by weight of isobornyl acrylate and/or 2-ethylhexyl acrylate
25 to 35% by weight of epoxy acrylate
20 to 30% by weight of china clay 5 to 15% by weight of corrosion inhibiting pigments
1 to 3% by weight of bis acyl phosphine oxide
0.1 to 10% by weight of adhesion promoters pigment dispersants, flow aids, wetting aids and rheology modifiers.

The coating composition can be applied by conventional means such as by brush, roller, sponge, spray gun or aerosol, preferably brush or aerosol. When applied by aerosol the primer composition additionally includes one or more propellants. The substrate can be for example, metal, plastic, wood or glass. A suitable film thickness can be achieved as a result of one single application or several applications.

The primer composition is cured by exposure to UV radiation. When several applications are used, the primer can be cured after each application or only after the final application. The ratio of UV-B content to UV-A content of the radiation is 1:1 or less. Preferably the UV-B to UV-A ratio is 0.2:1 or less, more preferably 0.05:1 or less and even more preferably 0.025:1 or less. The radiation has substantially no UV-C content. UV-A radiation is any radiation falling within the 320–400 nm wavelength interval, UV-B radiation is any radiation falling within the 280–320 nm wavelength and UV-C radiation is any radiation falling within the 100–280 nm wavelength interval.

The radiation may be provided by any suitable UV lamp and preferably the lamp(s) are positioned so that they are between 5 and 60 cm away from the surface of the primer. More preferably the lamp(s) are positioned so that they are from 10 to 30 cm away from the surface of the primer.

Preferably the primer is exposed to the UV radiation for from 30 seconds to 10 minutes, more preferably from 1 to 3 minutes.

The primer can be sanded using sand- or glasspaper prior to topcoating.

Preferably any sticky uncured surface layer is removed by wiping the surface of the primer with a volatile organic cleaning solvent prior to optionally sanding and topcoating. The volatile organic cleaning solvent can be an aliphatic or aromatic hydrocarbon such as Solvesso 100™, toluene or xylene, an alcohol such as butanol or isopropanol, an ester such as butyl acetate or ethyl acetate, a ketone such as acetone, methyl isobutyl ketone or methyl ethyl ketone, an ether, an ether-alcohol or an ether-ester or a mixture of any of these. Preferably it is one or more petroleum distillates such as the SBP range available from Carless Refining and Marketing.

The primer may be topcoated with any suitable refinish system in order to achieve the desired final colour and appearance. For example the primer can be coated with a waterborne basecoat such as Aquabase P965 Line available from ICI Autocolor followed by a soventborne two pack polyurethane clearcoat such as P190–670 available from ICI Autocolor. Alternatively it can be topcoated with a solventborne basecoat such as 2K P422 Line available from ICI Autocolor followed by a soventborne two pack polyurethane clearcoat such as P190–643 available from ICI Autocolor. Alternatively it can be topcoated with a solventborne single layer two pack polyurethane topcoat such as 2K HS Plus P471 line available from ICI Autocolor.

The process is particularly suited to, but not limited to, carrying out spot repairs to damaged vehicles. A spot repair refers to a repair of damage that is limited to small area of a vehicle panel, usually less than 40 cm².

According to the present invention there is also provided a coated or partially coated by the process of the invention.

The invention will now be illustrated by means of the following examples.

EXAMPLES I–VI

Primer Compositions

Primer formulations I–VI shown in Table 1 were prepared according to the following process.

All components A and B and solvents were added to a suitable vessel and stirred until homogeneous. The photo-initiators and dispersants were then added with stirring. If necessary the temperature of the mixture was raised to no higher than 80° C. in order to form a clear homogeneous mixture.

The vessel was then transferred to a high-speed disperser. The extenders were added slowly with stirring. Once the addition was complete, dispersion was continued until a fineness of grind of 50–60 μm was achieved (approximately 30 minutes). Any adhesion promoters were then added and the primer was stirred slowly for five minutes.

TABLE I

| Example | | I | II | III | IV | V | VI |
|---|---|---|---|---|---|---|---|
| Component B | UVE 150 | 29.9 | | | 21.4 | | 14.9 |
| | UVU 316 | | 28.2 | | | | |
| | UVS 500 | | | 12.0 | | | |
| | SR 349 | | | | | 36.6 | |
| | 500A | | | 12.0 | | | |
| Adhesion promoters | SR 9050 | 6.0 | | | 4.3 | | 3.0 |
| | E 170 | | | | | 3.6 | |
| Component A | IBoMa | 29.9 | 28.2 | 23.9 | 10.7 | | 14.9 |
| | EHA | | | 8.8 | 10.7 | | |
| Dispersants | Byk 116 | 0.2 | | | 0.2 | | |
| | S24 000 | | | | | 3.6 | 0.3 |
| Photo-initiators | I149 | | 3.5 | 2.7 | | | |
| | I819 | 2.0 | | | 1.3 | | 1.0 |
| | D4265 | | | | | 1.2 | |
| Extenders and pigments | Talc | | | | 21.4 | 40.3 | 24.9 |
| | China clay | 22.8 | 23.6 | 23.9 | 21.4 | | 24.9 |
| | Barytes | | 9.4 | 9.5 | | | |
| | Anti-corrosive | 9.2 | 7.1 | 7.2 | 8.6 | | 10.1 |
| Solvents | MEK | | | | | 14.7 | |
| | EEP | | | | | | 6.0 |

All amounts in the above table are parts by weight.
Key
UVE 150 Crodamer UVE 150—epoxy acrylate available from Croda
UVU 316 Crodamer UVU 316—urethane acrylate available from Croda
UVS 500 Crodamer UVS 500—silicone acrylate available from Croda
SR 349 epoxy acrylate available from Sartomer
500A Roskydal 500A—unsaturated polyester available from Bayer plc
SR 9050 acidic adhesion promoter available from Sartomer
E 170 Ebecryl 170—acidic adhesion promoter available from UCB Chemicals
IBoMa isobornyl methacrylate
EHA 2-ethylhexyl acrylate
Byk 116 pigment dispersant available from Byk
S24 000 Solsperse 24 000—pigment dispersant available from Avecia
I149 Irgacure 149—photoinitiator available from Ciba
I819 Irgacure 819—photoinitiator available from Ciba
D4265 Darocur 4265—photoinitiator available from Ciba
Anti-corrosive Zinc/aluminium phosphate anti-corrosive pigment.

EXAMPLES I–VI

Primer compositions I–VI were applied to clean glass plates using a 150-micron blockspreader. The coatings were then cured by exposing them to UV radiation provided by a UV H253 UV lamp (available from UV Light Technologies—the unit contained a 250 W iron doped metal halide lamp fitted with a black glass filter to produce a UV-A output spectrum between 320 nm and 400 nm) for one minute. A lamp to panel distance of 20 cm was used. After wiping with a mixture of equal parts by weight of SBP3 and SBP6 (available from Carless Refining and Marketing) the primers could all be sanded easily with P360 sandpaper.

Preparation of Test Panels

Several steel panels measuring approximately 45 cm by 45 cm were coated with 20–25 microns of chromate free epoxy adhesion primer P565–895 (available from ICI Autocolor, used as instructed on the product data sheet), followed by 100–120 microns of primer filler/surfacer P565–481 (available from ICI Autocolor, used as instructed on the product data sheet). The panels were baked at 60° C. for thirty minutes and then sanded with P360 sandpaper.

100 parts by weight of Aquabase medium coarse aluminium basic P968–9987 was mixed with 10.3 parts by weight of Aquabase activator P935–2018 and 3 parts by weight of Aquabase additive thinner P275–366 (all available from ICI Autocolor). This was applied to all of the panels to give a film build of 12–15 microns. The panels were then coated with P190–670 clearcoat (available from ICI Autocolor, used as instructed on the product data sheet). The panels were than left to age for one week.

After ageing the paint was removed from an area at the centre of each panel of approximately 25 cm² using P120 sand paper. Test panels prepared in this manner were used to simulate a spot repair process.

EXAMPLE VII

The following examples represent the process that would be used in an automotive refinish bodyshop to repair small areas of damaged paintwork.

UV Process of the Present Invention 100 parts by weight of primer composition I from table 1 were mixed with 10 parts by weight of acetone. This was then spray applied onto the exposed metal and a small area of the surrounding paint of a prepared test panel to give a dry film build of 100–120 microns. The primer composition was allowed to flash off for five minutes and then cured by exposing it to UV radiation provided by a UV H253 UV lamp (available from UV Light Technologies—the unit contained a 250 W iron doped metal halide lamp fitted with a black glass filter to produce a UVA output spectrum between 320 nm and 400 nm) for one minute. A lamp to panel distance of 20 cm was used. After exposure the primer was wiped with spirit wipe P850–1402 (available from ICI Autocolor) and then panel was sanded with P360 sandpaper. After sanding the film build of primer over bare metal was about 100 microns and there was a smooth transition from the primer to surrounding paint.

100 parts by weight of Aquabase medium coarse aluminium basic P968–9987 was mixed with 10.3 parts by weight of Aquabase activator P935–2018 and 3 parts by weight of Aquabase additive thinner P275–366 (all available from ICI Autocolor). This was applied to all of the panel to give a film build of 12–15 microns. The panel was then coated with P190–670 clearcoat (available from ICI Autocolor, used as instructed on the product data sheet) and the panel was baked at 60° C. for 30 minutes. The appearance of the panel was studied carefully at weekly intervals The gloss and distinction of image were excellent and it was not possible to determine that a repair had been carried out. The elapsed time between application of the primer and commencement of application of the Aquabase was 18 minutes.

Conventional Process

Chromate Free Epoxy adhesion primer P565–895 (available from ICI Autocolor, used as instructed on the product data sheet) was spray applied onto the exposed metal and a small area of the surrounding paint of a prepared test panel to give a dry film build of 20–25 microns. Five minutes later, Fast Hi-build Filler/Surfacer P565–481 (available from ICI Autocolor, used as instructed on the product data sheet) was then applied to a slightly larger area to give a film build of 100–120 microns. Three coats were required with three minutes flash-off between each coat. The panel was baked at 60° C. for 25 minutes and then, once cool, sanded with P360 sandpaper. After sanding the film build of primer over bare metal was about 100 microns and there was a smooth transition from the primer to surrounding paint.

100 parts by weight of Aquabase medium coarse aluminium basic P968–9987 was mixed with 10.3 parts by weight of Aquabase activator P935–2018 and 3 parts by weight of Aquabase additive thinner P275–366 (all available from ICI Autocolor). This was applied to all of the panel to give a film build of 12–15 microns. The panel was then coated with P190–670 clearcoat (available from ICI Autocolor, used as instructed on the product data sheet) and the panel was baked at 60° C. for thirty minutes. The appearance of the panel was studied carefully at weekly intervals. The gloss and distinction of image were excellent and it was not possible to determine that a repair had been carried out. The elapsed time between application of the primer and commencement of application of the Aquabase was 50 minutes.

EXAMPLE VIII

The following example represents a process that could be used in an automotive refinish body shop having no suitable heat source to repair small areas of damaged paintwork.

UV Process of the Invention

Primer composition I from table 1 was applied onto the exposed metal and a small area of the surrounding paint of a prepared test panel to give a dry film build of 100–120 microns. The application was carried out using a professional quality pure bristle brush. The primer composition was cured by exposing it to UV radiation provided by a UV H253 UV lamp (available from UV Light Technologies—the unit contained a 250 W iron doped metal halide lamp fitted with a black glass filter to produce a UV-A output spectrum between 320 nm and 400 nm) for one minute A lamp to panel distance of 20 cm was used. After exposure the primer was wiped with spirit wipe P850–1402 (available from ICI Autocolor) and then panel was sanded with P360 sandpaper. After sanding the film build of primer over bare metal was about 100 microns and there was a smooth transition from the primer to surrounding paint.

100 parts by weight of Aquabase medium coarse aluminium basic P968–9987 was mixed with 10.3 parts by weight of Aquabase additive activator P935–2018 and parts by weight of Aquabase thinner P275–366 (all available from ICI Autocolor). This was applied to all of the panel to give a film build of 12–15 microns. The panel was then coated with P190–670 clearcoat (available from ICI Autocolor, used as instructed on the product data sheet) and the panel was left to dry at ambient temperature overnight. The appearance of the panel was studied carefully at weekly intervals. The gloss and distinction of image were excellent and it was not possible to determine that a repair had been carried out. The elapsed time between application of the primer and commencement of application of the Aquabase was 13 minutes.

Conventional Process

IK Etch Primer Aerosol P565–908 (available from ICI Autocolor, used as instructed on the product data sheet) was spray applied onto the exposed metal and a small area of the surrounding paint of a prepared test panel to give a dry film build of 20–25 microns. Five minutes later, Fast Hi-build Filler/Surfacer P565–481 (available from ICI Autocolor, used as instructed on the product data sheet) was then applied to a slightly larger area to give a film build of 100–120 microns. Three coats were required with three minutes flash-off between each coat. The panel was allowed to dry at ambient temperature for 4 hours and then sanded with P360 sandpaper. After sanding the film build of primer over bare metal was about 100 microns and there was a smooth transition from the primer to surrounding paint.

100 parts by weight of Aquabase medium coarse aluminium basic P968–9987 was mixed with 10.3 parts by weight of Aquabase activator P935–2018 and 3 parts by weight of Aquabase additive thinner P275–366 (all available from ICI Autocolor). This was applied to all of the panel to give a film build of 12–15 microns. The panel was then coated with P190–670 clearcoat (available from ICI Autocolor, used as instructed on the product data sheet) and the panel was baked at 60° C. for thirty minutes. The appearance of the panel was studied carefully at weekly intervals. The gloss and distinction of image were excellent and it was not possible to determine that a repair had been carried out. The elapsed time between application of the primer and commencement of application of the Aquabase was 260 minutes.

EXAMPLE IX

The film properties of refinish coatings prepared in accordance with the invention were studied as follows:

A. Adhesion and Humidity Resistance Over Galvanised Steel

Four galvanised steel panels were lightly sanded with P120 sandpaper and solvent wiped with white spirit. Two of the panels were then coated with 20–25 microns of chromate free epoxy adhesion primer P565–895 (available from ICI Autocolor, used as instructed on the product data sheet), followed by 100–120 microns of primer filler/surfacer P565–481 (available from ICI Autocolor, used as instructed on the product data sheet). The panels were baked at 60° C. for thirty minutes and then sanded with P360 sandpaper.

100 parts by weight of primer composition I from table 1 were mixed with 10 parts by weight of acetone. This was then spray applied onto the other panels to give a dry film build of 100–120 microns. The primer composition was cured by exposing it to UV radiation provided by a Phillips HB171 facial solarium for two minutes. A lamp to panel distance of 10 cm was used. After exposure the primer was wiped with spirit wipe P850–1402 (available from ICI Autocolor) and then sanded with P360 sandpaper.

100 parts by weight of Aquabase medium coarse aluminium basic P968–9987 was mixed with 10.3 parts by weight of Aquabase activator P935–2018 and 3 parts by weight of Aquabase additive thinner P275–366 (all available from ICI Autocolor). This was applied to all of the panels to give a film build of 12–15 microns. The panels were then coated with P190–670 clearcoat (available from ICI Autocolor, used as instructed on the product data sheet). All panels had excellent appearance and there was no discernible deterioration in appearance over one month. Crosshatch adhesion was measured according to ASTM D3359 one day, one week and one month after application using one of the panels coated with each primer. The other panels were left at room temperature for one week and then immersed in water at 38° C. for ten days. The appearance and crosshatch adhesion was assessed after 3, 7 and 10 days of immersion. The results are shown in table 2

TABLE 2

| Primer | Crosshatch adhesion (% remaining) | | | Water soak | | | | | |
|---|---|---|---|---|---|---|---|---|---|
| | | | | Appearance | | | Crosshatch adhesion (% remaining) | | |
| | 1 day | 1 week | 1 month | 1 day | 7 days | 10 days | 1 day | 7 days | 10 days |
| p565-895/ P565-481 | 72 | 78 | 88 | No change | No change | No change | 90 | 100 | 97 |
| Composition I | 100 | 100 | 100 | No change | No change | No change | 100 | 100 | 100 |

The results show that the performance of the UV cured primer without a separate adhesion primer is at least as good as the conventional primer with the adhesion primer.

B. Adhesion and Humidity Resistance Over Bare Steel

Four cold rolled steel test panels were lightly sanded with P120 sandpaper and solvent wiped with white spirit. Two of the panels were then coated with 20–25 microns of Chromate Free Etch Primer P565–713 (available from ICI Autocolor, used as instructed on the product data sheet), followed by 100–120 microns of Fast Hi-build Filler/ Surfacer P565–888 (available from ICI Autocolor, used as instructed on the product data sheet). The panels were baked at 60° C. for thirty minutes and then sanded with P360 sandpaper.

100 parts by weight of primer composition III from table 1 were mixed with 10 parts by weight of acetone. This was then spray applied onto the other panels to give a dry film build of 100–120 microns. The primer composition was cured by exposing it to UV radiation provided by a Phillips HB171 facial solarium for two minutes. A lamp to panel distance of 10 cm was used. After exposure the primer was wiped with spirit wipe P850–1402 (available from ICI Autocolor) and then sanded with P360 sandpaper.

4 parts by volume of 2K Super White Basic P425–900 where activated with 2 parts by volume of Standard Medium Temperature Hardener P210–770 and thinned with 0.5 parts by volume of Low VOC Medium Thinner P850–1693 (all available from ICI Autocolor). This was applied to all of the panels to give a film build of about 50 microns. All panels had excellent appearance and there was no discernible deterioration in appearance over one month. Crosshatch adhesion was measured according to ASTM D3359 one day, one week and one month after application using one of the panels coated with each primer. The other panels were left at room temperature for one week and then immersed in water at 38° C. for ten days. The appearance and crosshatch adhesion was assessed after 3, 7 and 10 days immersion. The results are shown in table 3

TABLE 3

| | Crosshatch adhesion (% remaining) | | | Water soak | | | | | |
|---|---|---|---|---|---|---|---|---|---|
| | | | | Appearance | | | Crosshatch adhesion (% remaining) | | |
| Primer | 1 day | 1 week | 1 month | 1 day | 7 days | 10 days | 1 day | 7 days | 10 days |
| p565-713/ P565-888 | 100 | 98 | 99 | No change | No change | No change | 88 | 95 | 98 |
| Composition III | 100 | 98 | 99 | No change | No change | Few small blisters | 100 | 100 | 100 |

The results show that the performance of the UV cured primer without a separate adhesion primer is at least as good as the conventional primer with the adhesion pruner.

What is claimed is:

1. A process for priming a surface comprising;
   i) applying a UV radiation curable to the area to be primed
   ii) curing the primer with UV radiation provided by one or more UV lamps having a UV-B:UV-A ratio of 1:1 or less,
   the UV radiation curable primer comprising
   A) 0–84% by weight of one or more compounds containing one ethylenically unsaturated free-radically polymerisable group per molecule
   B) 5–50% by weight of one or more compounds containing two or more ethylenically unsaturated free radically polymerisable groups per molecule
   C) 10–70% by weight of one or more pigments, fillers and/or dyes
   D) 1–8% by weight of one or more photoinitiators
   E) 0–20% by weight of volatile organic solvent said
   F) 0–10% by weight of customary additives.

2. A process as claimed in claim 1, which also includes:
   iii) sanding the primer and topcoating the primer with one or more topcoats.

3. A process as claimed in claim 2, in which the surface is wiped with a solvent after curing and before sanding and topcoating.

4. A process as claimed in claim 1, in which the UV lamps have a UV-B:UV-A ratio of 0.2:1 or less.

5. A process as claimed in claim 1, in which the UV lamps have a UV-B:UV-A ratio of 0.05:1 or less.

6. A process as claimed in claim 1, in which the UV lamps have a UV-B:UV-A ratio of 0.25:1 or less.

7. A process as claimed in claim 1 in which component C consists principally of zinc sulphide, barium sulphate, china clay and corrosion inhibiting pigments and/or other UV transparent or semi-transparent pigments or dyes.

8. A process as claimed in claim 1 in which the primer has a PVC of 10 to 50%.

9. A process as claimed in claim 1 in which component D includes a bis acyl phosphine oxide.

10. A process as claimed in claim 1 in which the primer is free from volatile organic solvent.

11. A process as claimed in claim 1 in which component A and/or component B contain acrylate groups.

12. A process as claimed in claim 11 in which component A is principally isobornyl acrylate and/or 2-ethylhexyl acrylate.

13. A process as claimed in claim 11 in which component B consists principally of one or more epoxy acrylates and/or one or more urethane acrylates.

14. A process as claimed in claim 13 in which component B is principally an epoxy acrylate.

15. A process as claimed in claim 1, in which the surface is part of a motor vehicle.

16. A process as claimed in claim 1, in which the curable primer comprises 5 to 50% by weight of component A.

17. A process as claimed in claim 1, in which the curable primer comprises 10 to 40% by weight of component A.

18. A process as claimed in claim 1, in which the curable primer comprises 25 to 35% by weight of component A.

19. A process as claim in claim 1, in which the primer contains 10–40% by weight of component B.

20. A process as claimed in claim 1, in which the primer contains 25 to 35% by weight of component B.

21. A process as claimed in claim 1, in which the primer contains
   25 to 35% by weight of isobornyl acrylate and/or 2-ethylhexyl acrylate
   25 to 35% by weight of epoxy acrylate
   20 to 30% by weight of china clay
   5 to 15% by weight of corrosion inhibiting pigments
   1 to 3% by weight of bis acyl phosphine oxide
   0.1 to 10% by weight of adhesion promoters, pigment dispersants, flow aids, wetting aids and rheology modifiers.

22. A process as claimed in claim 1, in which an aerosol is used to apply the primer and the primer composition additionally includes one or more propellants.

23. A process as claimed in claim 1, which is a refinishing process.

24. A surface whenever treated by a process as claimed in claim 1.

* * * * *

UNITED STATES PATENT AND TRADEMARK OFFICE
CERTIFICATE OF CORRECTION

PATENT NO. : 6,838,177 B2  
DATED : January 4, 2005  
INVENTOR(S) : David Robert Fenn et al.

Page 1 of 1

It is certified that error appears in the above-identified patent and that said Letters Patent is hereby corrected as shown below:

Title page,  
Item [56], References Cited, U.S. PATENT DOCUMENTS, insert the followings:  
-- 4,634,602, 01/1987 Sirkoch et al.  
  4,668,529, 05/1987 Blair  
  4,747,013, 05/1988 Dexel et al.  
  5,534,559, 07/1996 Leppard et al.  
  5,559,163 09/1996 Dawson et al.  
  5,747,115, 05/1998 Howell et al.  
FOREIGN PATENT DOCUMENTS  
DE4336748A1, 06/1994  
WO99/26732, 06/1999  
OTHER PUBLICATIONS  
Dynatron/Bondo Corporation, Technical Data Sheet, Sun/UV Activated Body Filler, 1995  
Westinghouse report, "Ultraviolet Radiation Curable Paints," by Grosset et al., September 30, 1981 --

Column 11,  
Line 21, insert -- primer -- before "to".  
Line 35, delete "said" and insert -- and -- after "solvent".

Signed and Sealed this

Thirty-first Day of May, 2005

JON W. DUDAS  
*Director of the United States Patent and Trademark Office*